US008694945B2

(12) United States Patent
Wang et al.

(10) Patent No.: US 8,694,945 B2
(45) Date of Patent: Apr. 8, 2014

(54) AUTOMATIC PLACE AND ROUTE METHOD FOR ELECTROMIGRATION TOLERANT POWER DISTRIBUTION

(75) Inventors: Chung-Hsing Wang, Hsinchu County (TW); King-Ho Tam, Hsinchu County (TW); Huang-Yu Chen, Hsinchu County (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 93 days.

(21) Appl. No.: 13/331,329

(22) Filed: Dec. 20, 2011

(65) Prior Publication Data
US 2013/0154128 A1 Jun. 20, 2013

(51) Int. Cl.
*G06F 17/50* (2006.01)
*H01L 23/498* (2006.01)

(52) U.S. Cl.
USPC ........... 716/126; 716/118; 716/120; 716/127; 716/133; 257/786

(58) Field of Classification Search
USPC ........... 716/118, 120, 126, 133, 127; 257/786
See application file for complete search history.

(56) References Cited

U.S. PATENT DOCUMENTS

| | | | | |
|---|---|---|---|---|
| 5,382,831 A | * | 1/1995 | Atakov et al. | 257/767 |
| 5,598,348 A | * | 1/1997 | Rusu et al. | 716/115 |
| 5,786,705 A | * | 7/1998 | Bui et al. | 324/762.1 |
| 5,900,735 A | * | 5/1999 | Yamamoto | 324/537 |
| 6,320,262 B1 | * | 11/2001 | Murakami | 257/758 |
| 6,546,538 B1 | * | 4/2003 | Rubdi et al. | 716/115 |
| 6,609,242 B1 | * | 8/2003 | Slade | 716/127 |
| 6,714,037 B1 | * | 3/2004 | Hau-Riege et al. | 324/750.03 |
| 6,822,473 B1 | * | 11/2004 | Hau-Riege et al. | 324/762.1 |
| 6,925,627 B1 | * | 8/2005 | Longway et al. | 257/207 |
| 7,240,314 B1 | * | 7/2007 | Leung | 257/773 |
| 7,398,489 B2 | * | 7/2008 | Dinter et al. | 716/115 |
| 7,786,513 B2 | * | 8/2010 | Tsutsumi | 257/203 |
| 7,989,956 B1 | * | 8/2011 | Zhai et al. | 257/774 |
| 8,174,052 B2 | * | 5/2012 | Kim et al. | 257/207 |
| 8,431,968 B2 | * | 4/2013 | Lu et al. | 257/211 |
| 2005/0104133 A1 | * | 5/2005 | Kanno et al. | 257/371 |
| 2013/0074028 A1 | * | 3/2013 | Blatchford | 716/122 |

OTHER PUBLICATIONS

Lee Eng Han, "Gate to GDSII Place & Route Methodology", www.eda-utilities.com, 2007, p. 1-33.

* cited by examiner

*Primary Examiner* — Sun Lin
(74) *Attorney, Agent, or Firm* — Eschweiler & Associates, LLC

(57) ABSTRACT

The present disclosure relates to an electromigration tolerant power distribution network generated by an automatic place and route (APR) methodology. In some embodiments, an automatic place and route tool constructs a local power network having multi-level power rails. The multi-level power rails have interleaved segments of vertically adjacent metal layers, wherein each interleaved segment is shorter than a predetermined characteristic length corresponding to a Blech length. By limiting the length of the interleaved metallization segments, electromigration within the multi-level power rails is alleviated, allowing for the maximum current density requirement ($J_{max}$) for mean time to failures (MTTF) to be increased.

13 Claims, 6 Drawing Sheets

AUTOMATIC PLACE AND ROUTE METHOD FOR ELECTROMIGRATION TOLERANT POWER DISTRIBUTION

BACKGROUND

Modern day integrated chips comprise complex layouts having millions or billions of transistor devices. In order to lay out an integrated chip within a reasonable amount of time place and route methods are widely used. Place and route methods utilize automated technology to generate an integrated chip layout, such as for example a GDS file, from a high level description of an integrated chip architecture.

SUMMARY

Some aspects of the present disclosure provide for an electromigration tolerant power distribution network generated by an automatic place and route (APR) methodology. In some embodiments, an automatic place and route tool is configured to construct a local power network comprising multi-level local power rails, having interleaved segments of vertically adjacent metal wire layers. Because there is a lower limit for the length of metal wires that will allow electromigration to occur, known as a Blech length, each interleaved metal wire layer segment has a length shorter than a predetermined characteristic length corresponding to a Blech length. By limiting the length of the interleaved metal wire layer segments, electromigration within the multi-level power rails is alleviated, allowing for the maximum current density requirement ($J_{max}$) for mean time to failures (MTTF) to be increased.

BRIEF DESCRIPTION OF THE DRAWINGS

FIG. 5b illustrates a cross sectional view of some embodiments of an integrated chip generated from the integrated chip layout of FIG. 5a.

FIGS. 8b-8c illustrate sections of some embodiments of a two mask set for exposing the integrated chip layout of FIG. 9a.

DETAILED DESCRIPTION

Figure 1:
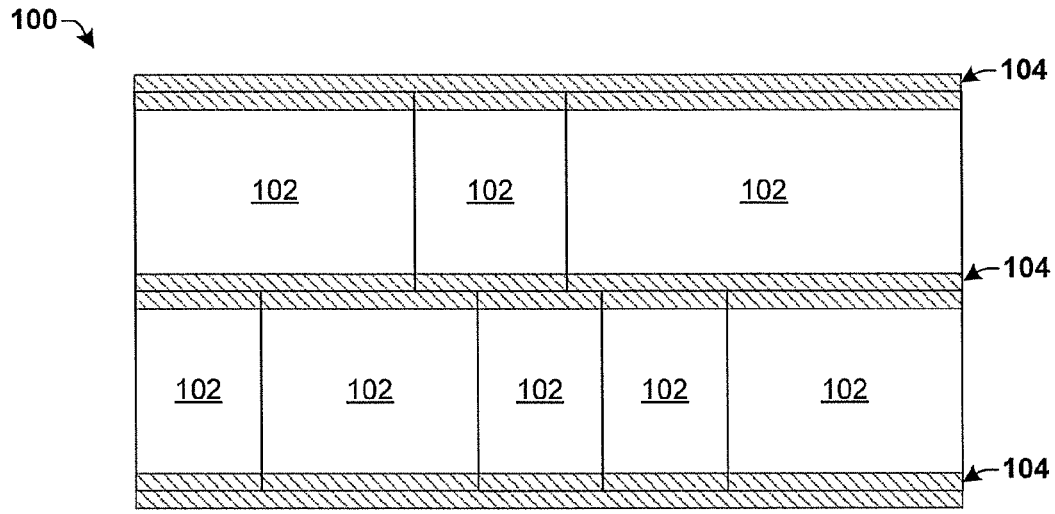
FIG. 1 illustrates a block diagram of some embodiments of an integrated chip layout comprising a plurality of standard cells having local power rails on a single metal layer.

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one of ordinary skill in the art, that one or more aspects described herein may be practiced with a lesser degree of these specific details. In other instances, known structures and devices are shown in block diagram form to facilitate understanding.

Standard cells, which correspond to a logical functionality (NAND, NOR, latch, etc.), are used as building block of modern integrated chips. In a standard cell place and route methodology, standard cells comprising a plurality of semiconductor devices are generated and are stored in a standard cell library. Integrated chip layouts are then constructed by automatic place and route tools, which place selected standard cells next to one another in the integrated chip layout.

FIG. 1 illustrates a block diagram of some embodiments of an integrated chip layout 100 comprising a plurality of standard cells 102. The integrated chip layout 100 further comprises a local power distribution network having single level power rails 104 that are pre-placed in every one of the standard cells 102. The single level power rails 104 comprise a single metal wire layer, such as for example a metal 1 level (i.e., a lowest metal level in a back-end-of-the-line stack), located within the standard cells 102 at a location along the boundaries of the standard cells 102. During a placement stage, the standard cells 102 are placed by an automatic place and route (APR) tool to abut one another.

Since the single level power rails 104 within each one of the standard cells 102 are comprised of a same metal level, abutting the standard cells 102 forms relatively long and thin, single level power rails 104 so as to reserve space within the standard cells 102 for routing of signal net wires. For example, single level power rails 104 can be on the order of tens of nanometers thick and tens or even hundreds of microns long.

The single level power rails 104 are configured to carry large direct current (DC) to front-end-of-the-line (FEOL) devices within the standard cells 102. As conductive electrons move within a thin, long power rail, they run into the metal particles resulting in a momentum transfer that gives rise to transport of the metal particles. This transport is called electromigration and can result opens in the power rails. Local power networks have not been subject to electromigration concerns in the past. However, in emerging technology nodes the current drawn by FEOL devices has remained roughly constant while the cross sectional size of power rails has decreased, causing the current density in power rails to increase. The maximum current density requirement ($J_{max}$) for guaranteeing minimum mean-time-to-failure (MTTF) due to electromigration in today's auto place and route digital circuits is limiting the drive current that can be drawn by FEOL devices. Furthermore, premature power rail electromigration can lead to an increased voltage drop through a local power network, causing circuit timing and signal integrity problems that lead to functional hardware failure.

Accordingly, some aspects of the present disclosure provide for an electromigration tolerant power distribution network generated by an automatic place and route (APR) methodology. In some embodiments, an automatic place and route tool is configured to construct a local power network comprising multi-level local power rails, having interleaved segments of vertically adjacent metal wire layers. Because there is a lower limit for the length of metal wires that will allow electromigration to occur, known as a Blech length, each interleaved metal wire layer segment has a length shorter than a predetermined characteristic length corresponding to a Blech length. By limiting the length of the interleaved metal wire layer segments, electromigration within the multi-level power rails is alleviated, allowing for the maximum current density requirement ($J_{max}$) for mean time to failures (MTTF) to be increased.

Figure 2:
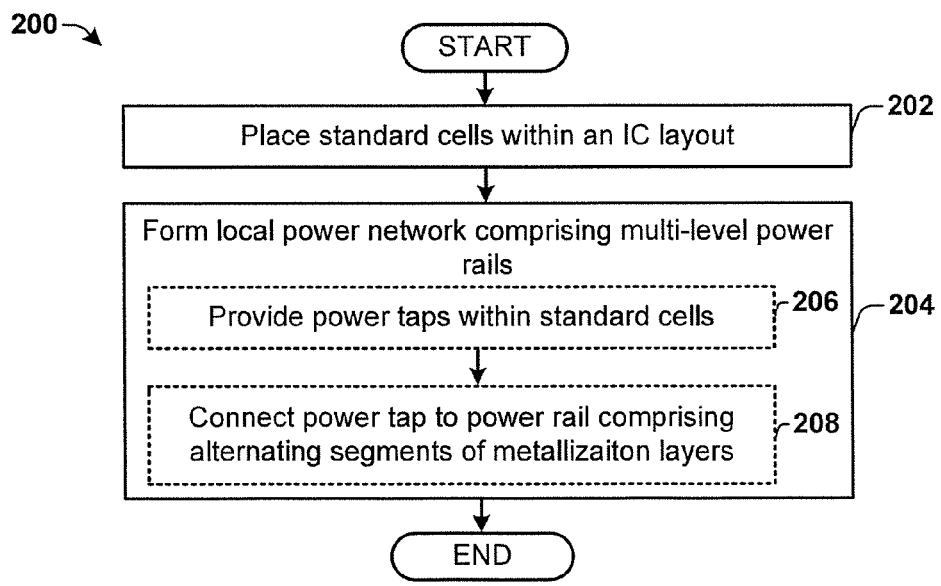
FIG. 2 illustrates a flow diagram of some embodiments of a method for forming an electromigration tolerant local power network.

FIG. 2 illustrates a flow diagram of some embodiments of a method 200 for forming an electromigration tolerant local power network. While the methods provided herein (e.g., method 200, 700, and 900) are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At 202 standard cells are placed within an integrated chip (IC) layout. In some embodiments, standard cells are placed using a place and route tool that selects standard cells from a standard cell library containing a plurality of standard cells. Each standard cell comprises a plurality of circuit elements, such as semiconductor devices, configured to provide for a logical functionality. For example, standard cells may provide for a logical functionality comprising a NAND gate, a NOR gate, a latch, inverter, etc. In some embodiments, the standard cells are placed by the place and route tool to abut one another.

At 204 a local power network is formed comprising multi-level local power rails. The multi-level local power rails comprise interleaved segments of multiple metal wire layers. For example, in some embodiments, the multi-level power rails comprise interleaved first and second metal wire layer segments. There is a lower limit for the length of metal wires that will allow electromigration to occur, known as a Blech length. Any metal wire that has a length below this limit will not fail by electromigration. Therefore, the interleaved metal wire layer segments are configured to respectively have a length that is shorter than a characteristic length corresponding to a Blech length so that electromigration is mitigated. The local power network is configured to receive power from a top-level grid network comprising global and/or semi-global wire lines that distribute power from I/O pads. The local power network provides the received power to circuit elements within individual standard cells. The local power network is typically located on lower metal levels within a back-end of the line stack. For example, in some embodiments the local power network may be formed from a first metal wire layer (metal 1 level) and a second metal wire layer (metal 2 level) within a back-end-of-the-line stack. However, in other embodiments the local power network may be formed from higher metal wire layers, such as a third metal wire layer (metal 3 level) and a fourth metal wire layer (metal 4 level).

In some embodiments, formation of the local power network comprises forming multi-level power rails connected to the standard cells by way of one or more power taps. The one or more power taps are configured to provide a connection between the circuit elements within the standard cell and multi-level power rails within the local power network.

For example, in some embodiments, one or more power taps are provided within the standard cells at 206. In some embodiments, the power taps are pre-placed in the standard cells prior to placement of the standard cells (step 202). For example, the power taps are pre-placed within standard cells located within a standard cell library. In other embodiments, the power taps can be placed in the standard cells after placement of the standard cells (step 202) is completed.

At 208 the one or more power taps are connected to one or more multi-level local power rails comprising alternating segments of adjacent metal wire layers.

Therefore, the method 200 forms a local power network that is electromigration tolerant by placing standard cells into an integrated chip layout in a manner that allows for the formation of a local power network comprising a multi-level power rails after placement of the standard cells. By forming power rails from segments of adjacent metal wire layers having a length less than a characteristic length corresponding to a Blech length, the maximum current density ($J_{max}$) can be increased without causing electromigration within the local power network. Therefore, the method allows for continued reduction of wire dimension and performance scaling.

Some embodiments of an exemplary semiconductor substrate, whereon such a method 200 is implemented, are illustrated in cross-sectional views of FIGS. 3-5b. Although FIGS. 3-5b are illustrated in reference to localized power rails extending horizontally along the boundary of the standard cells, it will be appreciated that the method and apparatus described herein may be applied to power strap connections extending vertically along the boundary of the standard cells.

Figure 3:
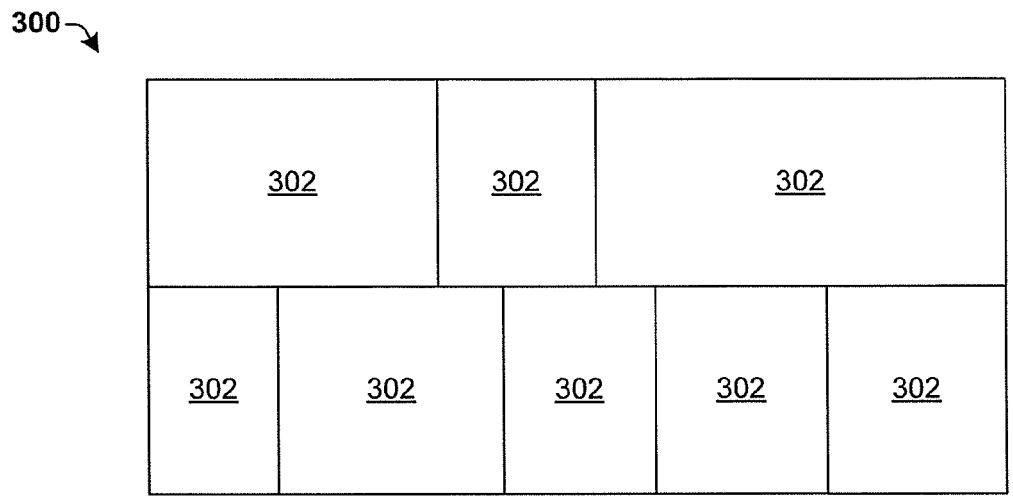
FIG. 3 illustrates block diagram of some embodiments of an integrated chip layout showing the placement of standard cells abutting one another.

FIG. 3 illustrates a block diagram of some embodiments of an integrated chip layout 300 showing the placement of standard cells 302 abutting one another. In some embodiments shown in integrated chip layout 300, the standard cells 302 are designed without local power rails attached.

Figure 4:
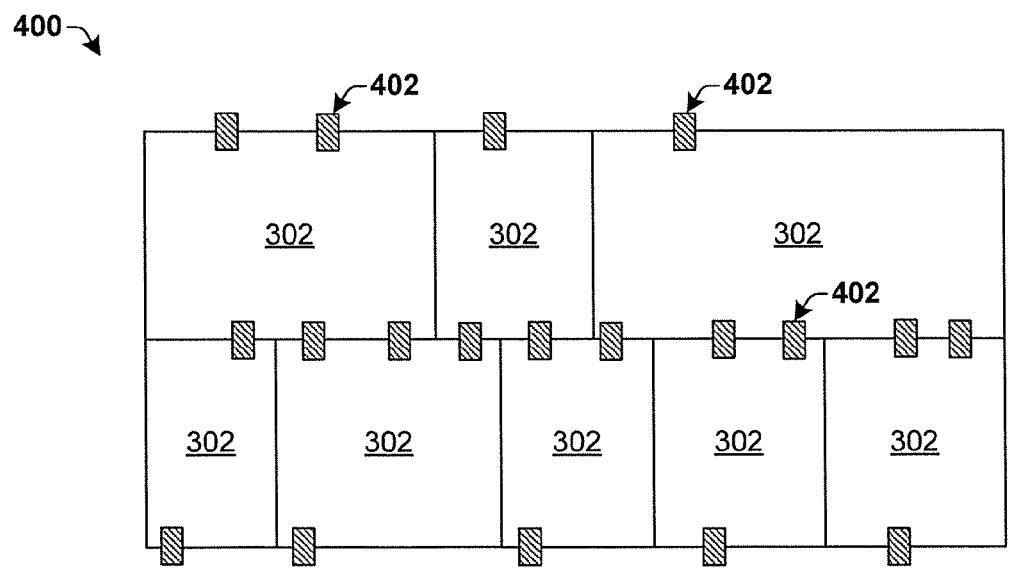
FIG. 4 illustrates block diagram of some embodiments of an integrated chip layout showing power taps within the abutting standard cells.

FIG. 4 illustrates block diagram of some embodiments of an integrated chip layout 400 showing power taps 402 within the standard cells 302. The power taps 402 comprise metal vias that are configured to connect a front-end-of-the-line (FEOL) device to multi-level power rails within a local power network. To achieve the connection, the power taps 402 are placed within a location in which power rails will be subsequently added after placement of the standard cells 302.

In some embodiments, the power taps 402 are placed at a regular pitch. Placing the power taps 402 at a regular pitch allows for routing of a integrated chip design that does not violate design-rules and which therefore avoids any disruption to current placement methods. For example, in some embodiments, the power taps 402 comprise contacts that placed in accordance with metal level pitches (i.e., at a center-to-center spacing equal to the center-to-center distance of a minimum metal line width and space). In other embodiments, the power taps 402 comprise contacts that connect front/middle-end transistor terminals to power rails pre-placed in accordance to poly-gate pitches. In such an embodiment, when top and bottom standard cells are abutted in the vertical direction (i.e. perpendicular to the power rail run-length direction), there will be no contact and metal spacing violation between the two sets of power taps from the respective abutted cells.

Figure 5A:
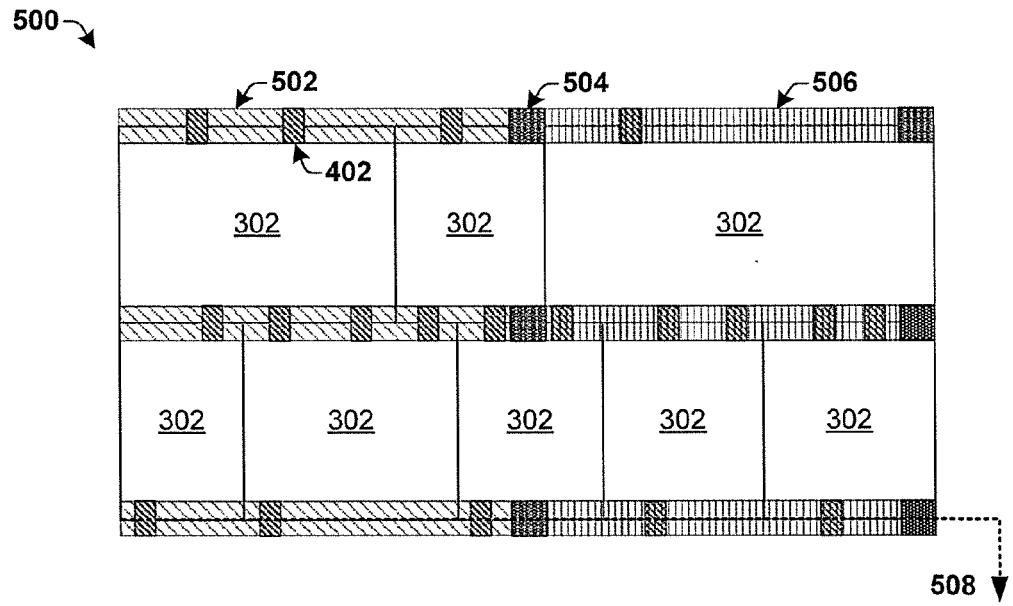
FIG. 5a illustrates a block diagram of some embodiments of an integrated chip layout having multi-level power rails connected to the power taps.

FIG. 5a illustrates a block diagram of some embodiments of an integrated chip layout 500 having a local power network comprising multi-level power rails connected to the power taps 402. In some embodiments, the multi-level power rails comprise a first metal wire layer 502 and a second metal wire layer 506 connected by way of a metal via layer 504. The first and second metal wire layers 502, 506 are connected to the power taps 402 along the boundary of the standard cells 302.

Figure 5B:
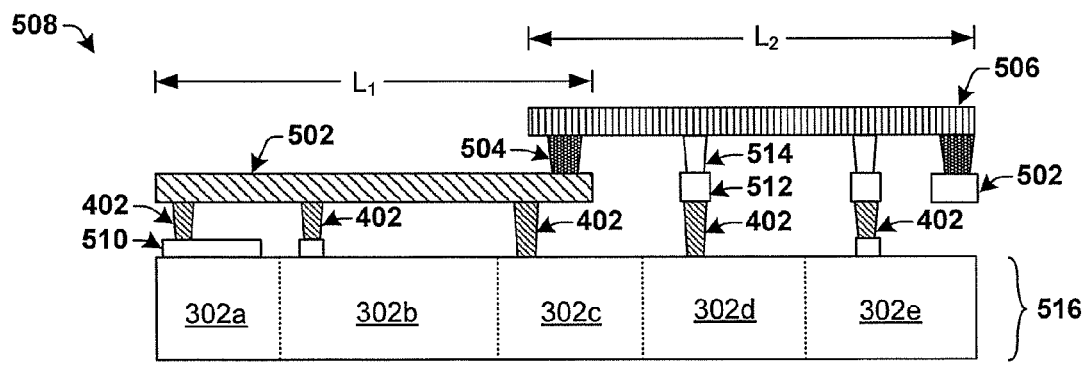

FIG. 5b illustrates a cross sectional view of some embodiments of an integrated chip 508 generated from the integrated chip layout of FIG. 5a. The multi-level power rail comprises interleaved short segments of vertically adjacent metal wire layers 502 and 506 connected to one another by a metal via layer 504. As shown in FIG. 5b, the first metal wire layer 502 comprises a first (i.e., lowest) metal wire level within the back-end-of-the-line stack and the second metal wire layer 506 comprises a second metal wire level within the back-end-of-the-line stack. The interleaved segments of metal wire layers 502 and 506 are connected to standard cells 302 by way of one or more power taps 402.

Each of the first and second metal wire layers, 502 and 506, comprise segments having lengths $L_1$ and $L_2$ less than a characteristic length. The segment lengths $L_1$ and $L_2$ are chosen to also allow for a via placement, between the alternating metal segments, that does not conflict within existing IC patterns within the standard cells. The characteristic length substantially mitigates electromigration within the metal wire segments according to the Blech effect. One of ordinary skill in the art will appreciate that according to the Blech effect, electromigration is not a concern for short metal segments below the characteristic length corresponding to a Blech length. This is due to the development of mechanical stress gradients that cause a force that opposed to the transport of metal atoms. The force causes a reverse migration process which cancels out the transport of metal atoms due to electromigration.

One of ordinary skill in the art will also appreciate that the characteristic length depends upon the width of the metal wire layer. The wider the metal wire layer, the longer the segments length can be without exceeding the characteristic length. For example, in one embodiment wherein the first and second metal wire layers 502 and 506 have a width of approximately 100 nm, the characteristic length is less than or equal to 5 μm (e.g., $L_1$, $L_2$<5 μm). In another embodiment, wherein the first and second metal wire layers 502 and 506 have a width of approximately 70 nm, the characteristic length is less than or equal to 4 μm (e.g., $L_1$, $L_2$<4 μm). The relatively short segment lengths $L_1$, $L_2$ of the metal wire layers 502, 506 reduces electromigration, allowing for a much higher $J_{max}$ under the same EM specification and thereby alleviating limitation of circuit performance due to $J_{max}$ limitation.

Referring again to FIG. 5b, in various embodiments the power taps comprise one or more metal layers that are configured to connect devices within a standard cell to the power rails. In some embodiments, the power taps 402 comprise a metal via layer (e.g., a Titanium contact) connected to a "metal 0" layer 510. For example, standard cells 302a and 302b comprise a "metal 0" layer 510 that extends to one or more elements within a substrate 516. The "metal 0" layer 510 is connected to a power tap 402 that is connected to a first metal wire layer 502 of the multi-level power rail.

In other embodiments, the power taps 402 comprise a metal via layer connected directly to a semiconductor device within the substrate 516. For example, standard cell 302c is connected directly to a power tap 402 that is connected to a first metal wire layer 502 of the multi-level power rail. In additional embodiments, wherein the multi-level power rail comprises a second metal wire layer 506, the power tap 402 is comprised within a vertical via chain extending from a semiconductor device to the second metal wire layer 506. For example, in standard cells 302d and 302e the second metal wire layer 506 is connected to the substrate 516 by way of a vertical via chain comprising a power tap 402, a first metal wire level 512, a first metal via level 514, and the second metal wire layer 506.

Figure 6:
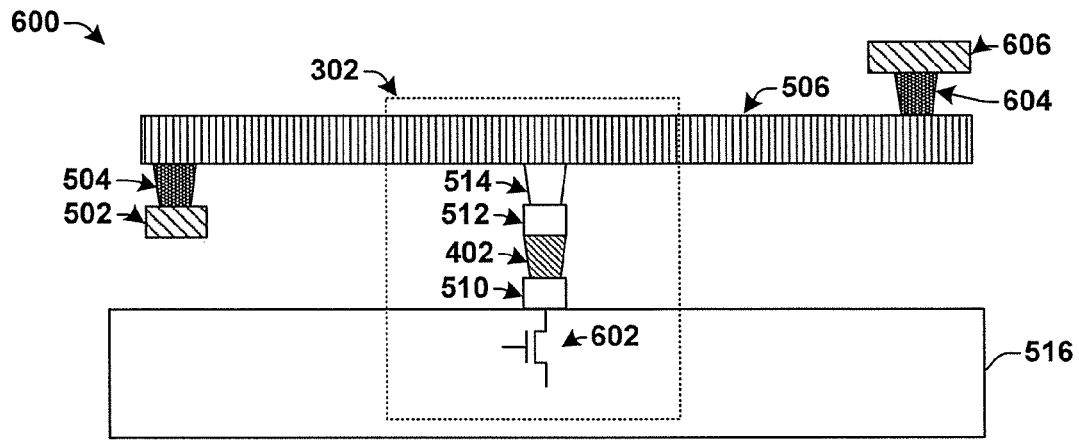
FIG. 6 illustrates a cross sectional view of some embodiments of an integrated chip generated from the disclosed place and route methodology.

FIG. 6 illustrates a cross sectional view of some embodiments of an integrated chip 600 generated from the disclosed place and route methodology. As illustrated in FIG. 6, a standard cell 302 comprises a plurality of metal layers connected to a semiconductor device 602 within a substrate 516. A power tap 402 comprising a "via 0" is vertically connected between a "metal 0" layer 510 and a first wire level 512. The "metal 0" layer 510 is in direct contact with the semiconductor device 602. In some embodiments, the "metal 0" layer 510 can further be used for routing between diffusion and/or polysilicon shapes within the substrate 516. The first wire level 512 is further connected to a second metal wire layer 506 in the multi-level power rail by way of a first metal via layer 514.

It will be appreciated the multi-level power rails are not limited to a two adjacent metal wire layers. In some embodiments, the multi-level power rails may include interleaved segments from additional metal wire layers having a length less than a Blech length, such that the multi-level power rails comprise more than two metal wire layers. For example, as shown in FIG. 6, the multi-level power rail comprises a third metal wire layer 606 connected to the second metal wire layer 506 by way of a second metal via layer 604. In additional embodiments, the multi-level power rails may further comprise additional metal wire layers (e.g., a fourth metal wire layer, a fifth metal wire layer, etc.).

Figure 7:
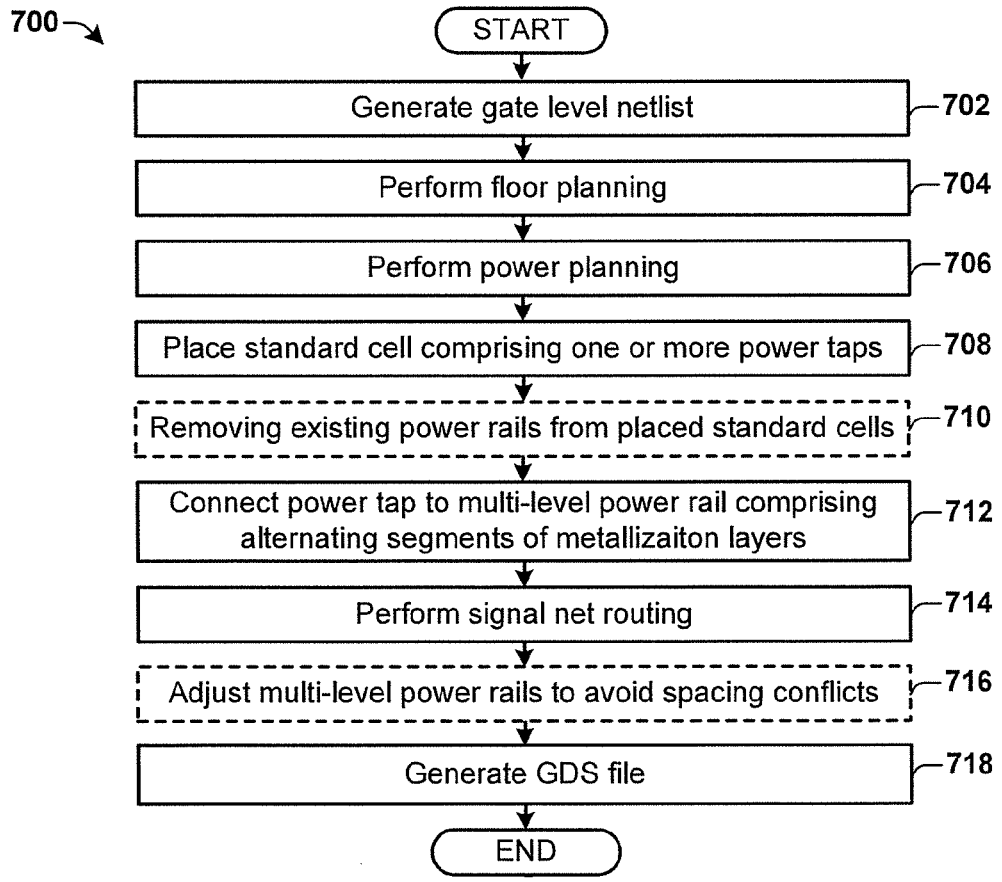
FIG. 7 illustrates a flow diagram of some embodiments of a more detailed method for forming an electromigration tolerant local power network.

FIG. 7 illustrates a flow diagram of some embodiments of a more detailed method 700 for forming an electromigration tolerant local power network.

At 702 a gate level netlist is generated. The gate level netlist is a high level description of the logical functions within the chip. The gate level netlist may be written in a high level hardware design language such as Verilog, for example.

At 704 floor planning is performed. Floor planning is the first step of physical IC layout. In some embodiments, floor planning comprises determining the basic physical layout parameters of the IC layout such as chip size, pad placement, macro placement, etc.

At 706 power planning is performed. Power planning comprises determining power connections within the IC that ensure adequate power and ground connections for the IC devices.

At 708 standard cells are placed.

In some embodiments, existing single level power rails are removed from the placed standard cells at 710. In such embodiments, existing pre-layout single level power rails are removed from the design after placement of the standard cells. This allows for existing standard cells having pre-layout single level power rails can be used during the placement step, so that the disclosed method can be implemented with minimal disruption to existing automatic place and route flows and with no need for redesign of existing standard cells.

At 712 the power taps are connected to multi-level power rails comprising alternating segments of adjacent metal wire layers.

At 714 signal nets are routed. Routing of signal nets comprises the placement of signal net wires on a metal layer within placed standard cells to carry non-power signals between different functional blocks. In some embodiments, signal net wires are routed on a same metal level as one of the vertically adjacent metal layers in the multi-level power rails.

In some embodiments, an additional post-routing adjustment of the multi-level power rails is performed at 716. The additional post-routing adjustment of the multi-level power rails step may be used when the minimum feature size of a first metal wire layer or a second metal wire layer is small, resulting in signal net wires having a spacing that is below a printable threshold (i.e., a threshold below which features cannot be printed with a single lithographic photomask). When the spacing of wires is below the printable threshold, decomposition is used to assigns different colors to features that are separated by a distance less than the minimum coloring spacing. Features of a same color are formed on a mask of a multiple patterning lithography exposure (e.g., a double patterning, triple patterning, quadruple patterning, etc.) so as to enable printing below the printable threshold. If different colors are not assigned to features violating minimum spacing rules, there will be a coloring conflict. The post routing adjustment of the multi-level power rails can be performed to swap the location of a first metal wire layer and a second metal wire layer as a means to resolve post-route color conflicts.

Figure 8A:
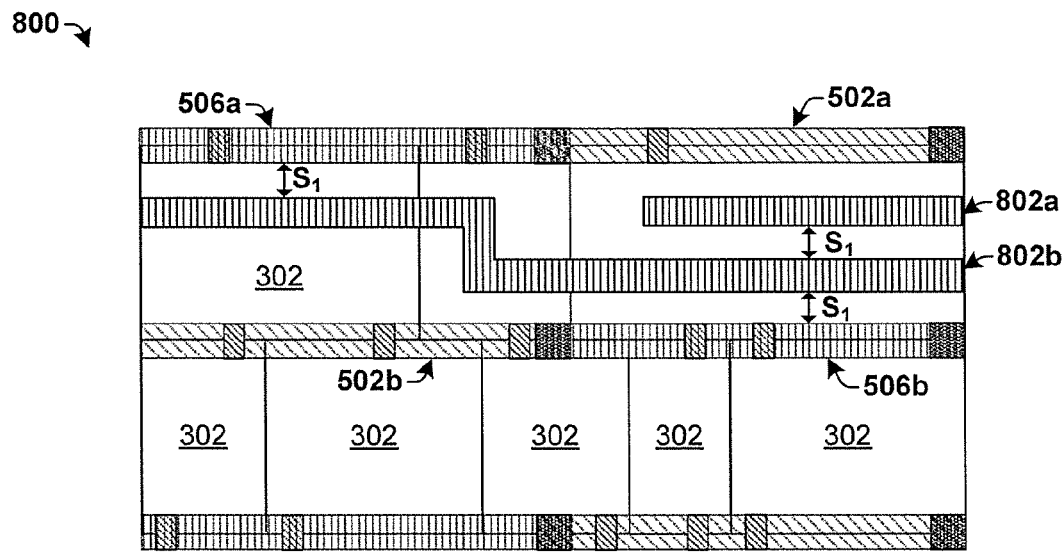
FIG. 8a block diagram of some embodiments of an integrated chip layout comprising a plurality of standard cells having local power rails.

For example, FIG. 8a is a block diagram of some embodiments of an integrated chip layout 800 comprising a plurality of standard cells 302 having a local power network comprising multi-level power rails having alternating segments of the first metal wire layer 502 and the second metal wire layer 506. Since signal net wires, 802a and 802b, can be formed on the same metal level as the second metal wire layers 506a and 506b in the multi-level power rails, the use of the second metal level in the multi-level power rails can cause coloring conflicts with the signal net wires, if the space between metal wires is too small. In integrated chip layout 800, a spacing between metal wires of $S_1$ indicates a coloring conflict is present between the metal wires. For example, in integrated chip layout 800 there are coloring conflicts between signal net wires 802a and 802b and between signal net wire 802b and the second metal wire layers, 506a and 506b, in the multi-level power rails.

The metal wire layers within the multi-level power rails can be adjusted as an additional design freedom to resolve such coloring conflicts. The additional design freedom allows conflicting metal wire segments to be switched to a different metal wire layer to avoid the coloring conflicts. For example, as illustrated in layout 804 of FIG. 8b, the position of the first and the second metal wire layers have been switched in the multi-level power rails, so that spacing of $S_1$, between signal net wires (e.g., 802b) and the multi-level power rails (e.g., 502a, 502b), is between different metal levels. Switching the position of the first and second metal wire layers within the multi-level power rails removes the coloring conflicts between signal net wire 802b and the second metal wire layers 506a and 506b in the multi-level power rails. The resulting integrated chip layout is decomposable into a two mask set that does not violate minimum spacing requirements.

Figure 8B:
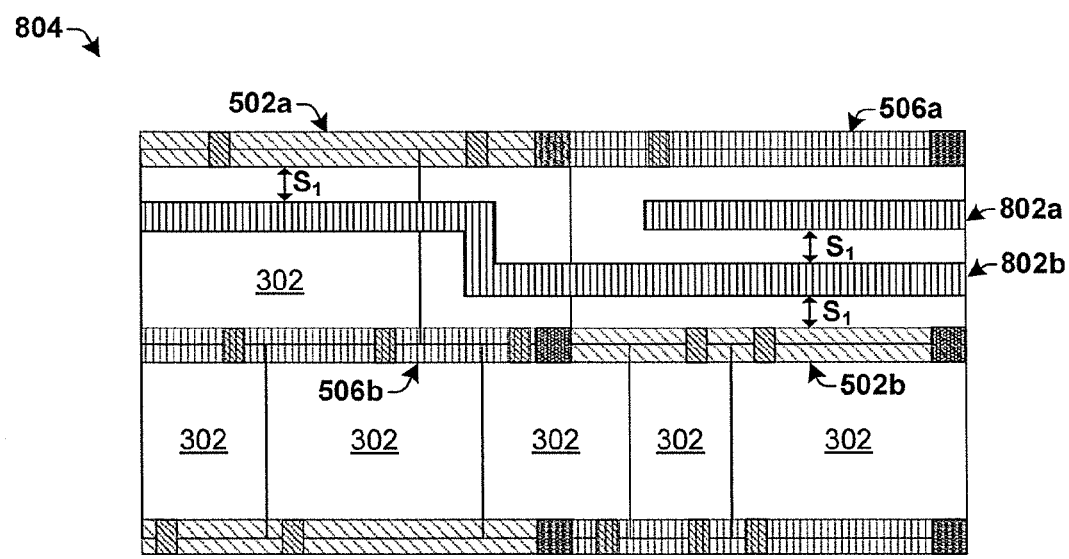
Figure 8C:
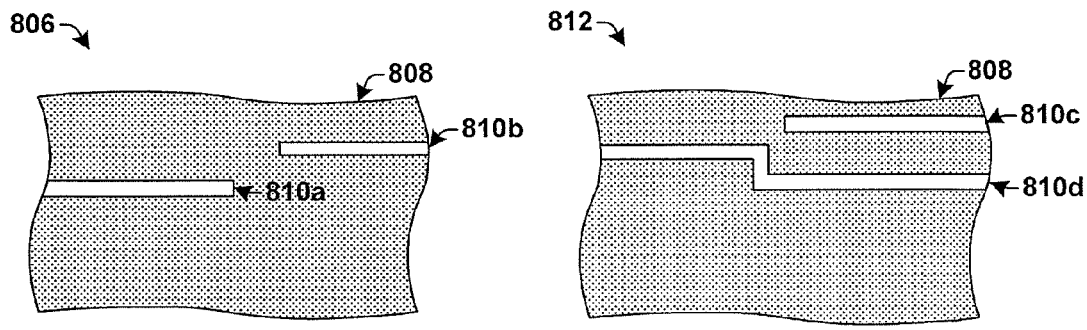

FIG. 8c illustrates a two photomask set for exposing the second metal layer of integrated chip layout of FIG. 8b using a double patterning lithography. A first photomask 806 has an opaque surface 808 (e.g., a chrome surface) with openings 810a and 810b that are respectively used in the formation of metal wire layer 506b and signal net wire 802a. The openings, 810a and 810b, are separated by a distance greater than the threshold value. A second photomask 812 has an opaque surface 808 with opening, 810c and 810d, which are used in the formation of metal wire layer 506a and signal net wire 802b.

It will be appreciated that although the first and second photomasks, 806 and 812, are illustrated as chrome masks with simple geometric openings corresponding to the location of the metal wires, that actual photomasks may not resemble the metal wires but instead will contain printing enhancement features added during optical proximity correction. Furthermore, it will be appreciated that a multiple-patterning lithography scheme may use more than two masks as shown in FIG. 8c. For example, a triple patterning lithography scheme would decompose an integrated chip design into a three mask set.

At 718 a GDS file is generated. After the layout is routed, a GDS can be formed by a place and route tool. The GDS file is a graphical representation of the integrated chip that can be subsequently used for making photomasks used in the IC fabrication process.

Figure 9:
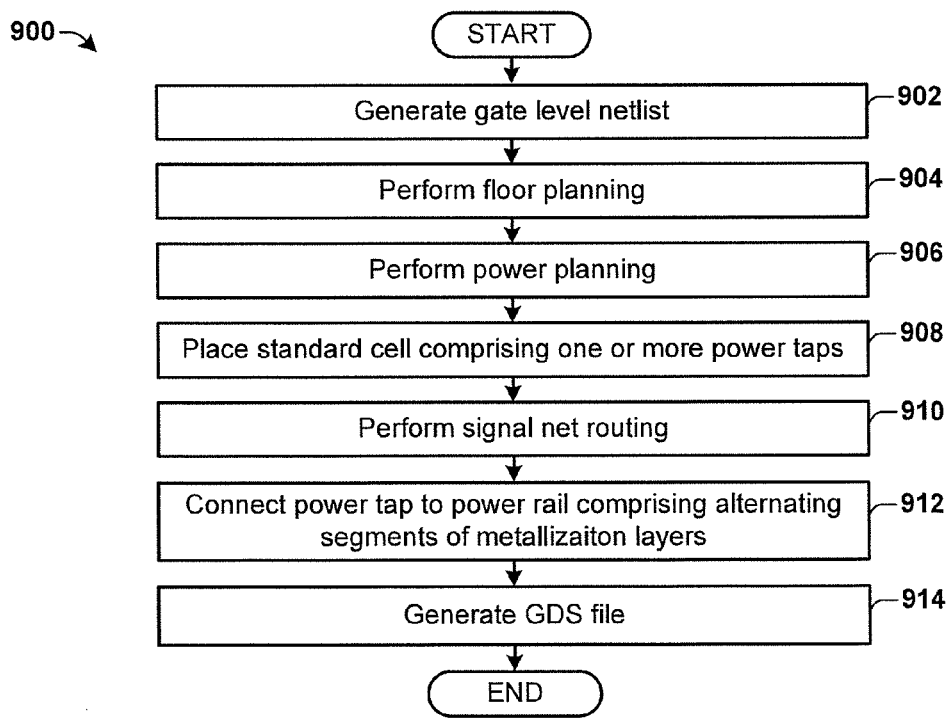
FIG. 9 illustrates a flow diagram of some embodiments of another method for forming an electromigration tolerant local power network.

FIG. 9 illustrates a flow diagram of some embodiments of another method 900 for forming an electromigration tolerant local power network.

In method 900, the signals nets are routed at step 910 before the power taps are connected to multi-level power rails comprising alternating segments of metal layers, at step 912. As explained above, connecting the power taps to multi-level power rails (step 912) after signal net routing (step 910) helps to resolve coloring conflicts since it allows place and route tools to see signal net wires in the middle of the standard cells to and respond in a manner that addresses the coloring conflicts.

It will be appreciated that equivalent alterations and/or modifications may occur to one of ordinary skill in the art based upon a reading and/or understanding of the specification and annexed drawings. The disclosure herein includes all such modifications and alterations and is generally not intended to be limited thereby. In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein Therefore, the present disclosure relates to a local power network comprising multi-level power rails having interleaved segment with a length shorter than a predetermined characteristic length corresponding to a Blech length.

In some embodiments, the present disclosure relates to an auto place and route method. The method comprises placing a plurality of standard cells, respective standard cells comprising one or more power taps configured to provide a connection between circuit elements within the standard cell and a local power network configured to provide power to the standard cell. The one or more power taps are connected to one or more multi-level power rails of the local power network, wherein the one or more power rails comprise interleaved segments of vertically adjacent metal wire layers.

In another embodiment, the present disclosure relates to an integrated chip. The integrated chip comprises a plurality of standard cells, respective standard cells comprising one or more semiconductor devices. One or more power taps are comprised within each standard cell and are connected to the one or more semiconductor devices. One or more multi-level power rails are connected to the one or more power taps. The one or more multi-level power rails comprise interleaved segments of vertically adjacent metal wire layers.

In another embodiment, the present disclosure relates to an auto place and route method. The method comprises placing a plurality of standard cells comprising one or more semiconductor devices within an integrated chip layout. The method further comprises forming a local power network comprising multi-level power rails having interleaved segments of vertically adjacent metal wire layers, wherein the interleaved segments have lengths that are shorter than a characteristic length corresponding to a Blech length.

What is claimed is:

1. An auto place and route method, comprising:
   placing a plurality of standard cells using a place and route tool, wherein each standard cell comprises one or more power taps configured to provide a connection between a circuit element within said each standard cell and a local power network, which is configured to provide power to the standard cells; and
   connecting the one or more power taps to one or more multi-level power rails of the local power network using the place and route tool, wherein the one or more power rails comprise interleaved segments of vertically adjacent metal wire layers that are configured to carry a current along a path that alternates between the vertically adjacent metal wire layers in a horizontal direction.

2. The method of claim 1, wherein the one or more multi-level power rails extend along boundaries of the plurality of standard cells.

3. The method of claim 1, further comprising:
   removing one or more single level power rails from within the plurality of standard cells prior to connecting the one or more power taps to the one or more multi-level power rails.

4. The method of claim 1, wherein the plurality of standard cells are designed without one or more single level power rails.

5. The method of claim 1, further comprising:
   routing signal net wires within the plurality of standard cells on a same metal level as one of the vertically adjacent metal wire layers prior to connecting the one or more power taps to the one or more multi-level power rails; and
   connecting the one or more power taps to the one or more multi-level power rails in a manner that assigns positions of the vertically adjacent metal wire layers so as to avoid coloring conflicts with the signal net wires.

6. The method of claim 1, further comprising:
   routing signal net wires within the plurality of standard cells on a same metal level as one of the vertically adjacent metal wire layers after connecting the one or more power taps to the one or more multi-level power rails; and
   adjusting a location of the vertically adjacent metal wire layers within the one or more multi-level power rails to avoid coloring conflicts between the signal net wires and the multi-level power rails.

7. The method of claim 1, wherein the one or more power taps are located at a regular pitch.

8. The method of claim 1, wherein the adjacent metal wire layers comprise:
   a first metal wire layer connected to the one or more power taps; and
   a second metal wire layer connected to the first metal wire layer by way of a first metal via layer.

9. The method of claim 8, wherein the one or more power taps comprise a metal via layer vertically located between thea device in a standard cell and the first metal wire layer.

10. The method of claim 8, wherein the first metal wire layer and the second metal wire layer respectively have a length corresponding to a Blech length.

11. An auto place and route method, comprising:
    placing a plurality of standard cells comprising one or more semiconductor devices within an integrated chip layout using a place and route tool; and
    forming a local power network comprising multi-level power rails having interleaved segments of vertically adjacent metal wire layers, configured to carry a current along a path that alternates between the vertically adjacent metal wire layers in a horizontal direction, using the place and route tool, wherein each of the interleaved segments has a length that is shorter than a characteristic length corresponding to a Blech length.

12. The method of claim 11, wherein forming a local power network comprises:
    providing one or more power taps within each of the plurality of standard cells; and
    connecting the one or more semiconductor devices to the multi-level power rails by way of the one or more power taps.

13. The method of claim 12, further comprising:
    routing signal net wires within the plurality of standard cells on a same metal level as one of the vertically adjacent metal wire layers; and
    selecting a position of the vertically adjacent metal wire layers that avoids coloring conflicts between the one of the vertically adjacent metal wire layers and the signal net wires;
    wherein the signal net wires and the one of the vertically adjacent metal wire layers are fabricated using a multiple patterning lithography exposure.

* * * * *

UNITED STATES PATENT AND TRADEMARK OFFICE
CERTIFICATE OF CORRECTION

Page 1 of 1

PATENT NO.         : 8,694,945 B2
APPLICATION NO.    : 13/331329
DATED              : April 8, 2014
INVENTOR(S)        : Wang et al.

It is certified that error appears in the above-identified patent and that said Letters Patent is hereby corrected as shown below:

In the Claims

Column 10, Claim 7, Line 5 Please replace "...wherein the one or more power taps..." with --wherein the power taps--

Column 10, Claim 9, Line 15 Please replace "...located between thea device..." with --located between a device--

Signed and Sealed this
Twenty-fourth Day of June, 2014

Michelle K. Lee
*Deputy Director of the United States Patent and Trademark Office*